(12) United States Patent
Chen et al.

(10) Patent No.: US 12,195,625 B2
(45) Date of Patent: *Jan. 14, 2025

(54) PULVERULENT THERMOPLASTIC POLYMER BLENDS

(71) Applicant: Stratasys, Inc., Eden Prairie, MN (US)

(72) Inventors: Liang Chen, Sewickley, PA (US); Chen Xu, Wexford, PA (US); Leslie J. Vescio, Ambridge, PA (US); Bruce D. Lawrey, Seattle, WA (US)

(73) Assignee: Stratasys, Inc., Eden Prairie, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/485,238

(22) Filed: Oct. 11, 2023

(65) Prior Publication Data

US 2024/0034879 A1 Feb. 1, 2024

Related U.S. Application Data

(62) Division of application No. 17/220,031, filed on Apr. 1, 2021, now Pat. No. 11,820,890.

(51) Int. Cl.
*C08L 75/08* (2006.01)
*B29B 9/12* (2006.01)
(Continued)

(52) U.S. Cl.
CPC .............. *C08L 75/08* (2013.01); *B29B 13/10* (2013.01); *B33Y 70/00* (2014.12);
(Continued)

(58) Field of Classification Search
CPC .......... C08L 75/08; C08L 75/06; C08L 75/04; B33Y 70/00
See application file for complete search history.

(56) References Cited

U.S. PATENT DOCUMENTS 3,169,949 A 2/1965 Buning
4,129,611 A 12/1978 Heiss
(Continued)

FOREIGN PATENT DOCUMENTS

CN 108559049 A 9/2018
CN 109135167 A 1/2019
(Continued)

OTHER PUBLICATIONS

International Search Report and Written Opinion received for PCT Patent Application No. PCT/US2022/018437, mailed on Jun. 15, 2022, 13 pages.

*Primary Examiner* — Marc S Zimmer
*Assistant Examiner* — Surbhi M Du
(74) *Attorney, Agent, or Firm* — Faegre Drinker Biddle & Reath LLP (57) ABSTRACT

The present disclosure is directed to pulverulent thermoplastic polymer blends comminuted to a particle size of less than 300 μm. The pulverulent thermoplastic polymer blends can include a first thermoplastic polyurethane and a second thermoplastic polyurethane at a weight ratio of from about 90:10 to about 30:70 first thermoplastic polyurethane to second thermoplastic polyurethane. The first thermoplastic polyurethane can include a reaction product of a first reaction mixture consisting of or consisting essentially of an aliphatic diisocyanate having a number average molecular weight of from 140 g/mol to 170 g/mol and an aliphatic diol having a number average molecular weight of from 62 g/mol to 120 g/mol. The second thermoplastic polyurethane can include a reaction product of a second reaction mixture comprising a polyisocyanate, an isocyanate-reactive component having a number average molecular weight of from 500 g/mol to 10,000 g/mol, and a chain extender having a
(Continued)

number average molecular weight of from 60 g/mol to 450 g/mol.

19 Claims, 6 Drawing Sheets

(51) Int. Cl.
*B29B 13/10* (2006.01)
*B33Y 70/00* (2020.01)
*C08G 18/32* (2006.01)
*C08G 18/73* (2006.01)
*C08L 75/04* (2006.01)
*C08L 75/06* (2006.01)

(52) U.S. Cl.
CPC .......... *C08G 18/3206* (2013.01); *C08L 75/04* (2013.01); *C08L 75/06* (2013.01); *B29B 2009/125* (2013.01); *C08G 18/73* (2013.01); *C08L 2205/02* (2013.01)

(56) References Cited

U.S. PATENT DOCUMENTS

| | | | |
|---|---|---|---|
| 5,140,768 A | 8/1992 | Forbes | |
| 5,281,677 A | 1/1994 | Onwunaka et al. | |
| 5,348,019 A | 9/1994 | Sluss et al. | |
| 5,415,815 A | 5/1995 | Bruno | |
| 5,874,133 A | 2/1999 | Cochran | |
| 6,013,210 A | 1/2000 | Gardner, Jr. | |
| 6,013,340 A | 1/2000 | Bonk et al. | |
| 6,245,047 B1 | 6/2001 | Feda et al. | |
| 6,410,638 B1 | 6/2002 | Kaufhold et al. | |
| 6,596,820 B2 | 7/2003 | Mueller et al. | |
| 7,591,968 B2 | 9/2009 | Melanson et al. | |
| 7,647,949 B2 | 1/2010 | Donohue et al. | |
| 7,842,303 B2 | 11/2010 | Kuo et al. | |
| 7,977,403 B2 | 7/2011 | Lohrmann et al. | |
| 8,313,760 B2 | 11/2012 | Hunter et al. | |
| 8,790,763 B2 | 7/2014 | Farkas et al. | |
| 8,888,773 B2 | 11/2014 | Chang et al. | |
| 9,078,813 B2 | 7/2015 | Kiser et al. | |
| 9,078,900 B2 | 7/2015 | Kuzma et al. | |
| 9,373,763 B2 | 6/2016 | Temmo | |
| 2003/0166794 A1 | 9/2003 | Muehlfeld et al. | |
| 2007/0192966 A1 | 8/2007 | Cottrell et al. | |
| 2009/0076480 A1 | 3/2009 | Pudleiner et al. | |
| 2011/0244015 A1 | 10/2011 | Kuzma et al. | |
| 2012/0088846 A1 | 4/2012 | Lergenmueller et al. | |
| 2013/0310687 A1 | 11/2013 | Takizawa et al. | |
| 2014/0209100 A1 | 7/2014 | Kiser et al. | |
| 2016/0310715 A1 | 10/2016 | Lee | |
| 2017/0326339 A1 | 11/2017 | Bailey et al. | |
| 2018/0319981 A1 | 11/2018 | Henze et al. | |
| 2020/0047410 A1 | 2/2020 | Achten et al. | |
| 2022/0315759 A1 | 10/2022 | Chen et al. | |

FOREIGN PATENT DOCUMENTS

| | | | | |
|---|---|---|---|---|
| DE | 113488 A | * | 6/1975 | |
| DE | 9207153 U1 | | 9/1993 | |
| EP | 2918618 A1 | | 9/2015 | |
| EP | 2885047 B1 | | 10/2016 | |
| JP | 2001-299922 A | | 10/2001 | |
| JP | 2001-299923 A | | 10/2001 | |
| KR | 10-2012-0061483 A | | 6/2012 | |
| WO | WO-2007079270 A2 | * | 7/2007 | ............... C08J 3/12 |
| WO | 2014/028136 A1 | | 2/2014 | |
| WO | WO-2020025312 A1 | * | 2/2020 | ............... B07B 1/00 |

* cited by examiner

PULVERULENT THERMOPLASTIC POLYMER BLENDS

CROSS REFERENCE TO RELATED APPLICATION

This application is a Divisional of U.S. patent application Ser. No. 17/220,031 filed Apr. 1, 2021, titled "PULVERULENT THERMOPLASTIC POLYMER BLENDS", the entire disclosures of which are hereby incorporated by reference herein.

BACKGROUND

Additive manufacturing generally involves building a three-dimensional (3D) object in a layer-by-layer manner. A variety of additive manufacturing techniques can be employed to build a 3D object using a layer-by-layer approach. Non-limiting examples can include photopolymerization techniques, powder bed fusion techniques, material extrusion techniques, jetting techniques, and direct energy deposition techniques, for example. Photopolymerization techniques generally employ a photopolymer resin that is selectively solidified when exposed to electromagnetic radiation. Powder bed fusion techniques generally include depositing a layer of powder material that is selectively fused together, such as via thermal fusion. Material extrusion techniques generally involve selectively extruding material through a nozzle to a build platform or build material in a layer-by-layer manner. Jetting techniques generally involve jetting or printing build materials and/or binders in a selective manner to form a 3D object. Direct energy deposition techniques generally involve melting powder material as it is deposited to a build platform or build material.

The various 3D printing techniques have individual material selection criteria. With specific reference to powder bed fusion techniques, polyamide 11 (PA11) and polyamide 12 (PA12) are among the most common-used materials. There are a variety of reasons for this material choice. For example, PA11 and PA12 have a variety of desirable performance benefits, such as low water uptake, high heat and chemical resistance, high flexibility, etc. Additionally, both of these materials have sharp melting and crystallization temperatures that make them desirable candidates for powder-based three-dimensional (3D) printing. However, PA11 and PA12 are not without limitations. For example, they do not have suitable physical properties for all applications. Further, the temperature window between the melting temperature and the crystallization temperature is not necessarily ideal. Thus, there still exists a need in the art for novel powder-based 3D printing materials having broader temperature windows and/or improved physical properties as compared to PA11 and PA12.

BRIEF DESCRIPTION OF THE DRAWINGS

Invention features and advantages will be apparent from the detailed description which follows, taken in conjunction with the accompanying drawings, which together illustrate, by way of example, various invention embodiments; and, wherein.

Reference will now be made to the exemplary embodiments illustrated, and specific language will be used herein to describe the same. It will nevertheless be understood that no limitation of the scope or to specific invention embodiments is thereby intended.

DESCRIPTION OF EMBODIMENTS

Although the following detailed description contains many specifics for the purpose of illustration, a person of ordinary skill in the art will appreciate that many variations and alterations to the following details can be made and are considered to be included herein. Accordingly, the following embodiments are set forth without any loss of generality to, and without imposing limitations upon, any claims set forth. It is also to be understood that the terminology used herein is for the purpose of describing particular embodiments only, and is not intended to be limiting. Unless defined otherwise, all technical and scientific terms used herein have the same meaning as commonly understood by one of ordinary skill in the art to which this disclosure belongs.

As used in this written description, the singular forms "a," "an" and "the" include express support for plural referents unless the context clearly dictates otherwise. Thus, for example, reference to "a polymer" or "the polymer" can include a plurality of such polymers.

In this application, "comprises," "comprising," "containing" and "having" and the like can have the meaning ascribed to them in U.S. Patent law and can mean "includes," "including," and the like, and are generally interpreted to be open ended terms. The terms "consisting of" or "consists of" are closed terms, and include only the components, structures, steps, or the like specifically listed in conjunction with such terms, as well as that which is in accordance with U.S. Patent law. "Consisting essentially of" or "consists essentially of" have the meaning generally ascribed to them by U.S. Patent law. In particular, such terms are generally closed terms, with the exception of allowing inclusion of additional items, materials, components, steps, or elements, that do not materially affect the basic and novel characteristics or function of the item(s) used in connection therewith. For example, trace elements present in a composition, but not affecting the compositions nature or characteristics would be permissible if present under the "consisting essentially of" language, even though not expressly recited in a list of items following such terminology. When using an open ended term, like "comprising" or "including," in this written description it is understood that direct support should be afforded also to "consisting essentially of" language as well as "consisting of" language as if stated explicitly and vice versa.

The terms "first," "second," "third," "fourth," and the like in the description and in the claims, if any, are used for distinguishing between similar elements and not necessarily for describing a particular sequential or chronological order. It is to be understood that any terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, the term "about" is used to provide flexibility to a numerical range endpoint by providing that a given value may be "a little above" or "a little below" the endpoint. Unless otherwise stated, use of the term "about" in accordance with a specific number or numerical range should also be understood to provide support for such numerical terms or range without the term "about". For example, for the sake of convenience and brevity, a numerical range of "about 50 milligrams to about 80 milligrams" should also be understood to provide support for the range of "50 milligrams to 80 milligrams." Furthermore, it is to be understood that in this specification support for actual numerical values is provided even when the term "about" is used therewith. For example, the recitation of "about" 30 should be construed as not only providing support for values a little above and a little below 30, but also for the actual numerical value of 30 as well. Unless otherwise specified, all numerical parameters are to be understood as being prefaced and modified in all instances by the term "about," in which the numerical parameters possess the inherent variability characteristic of the underlying measurement techniques used to determine the numerical value of the parameter.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "1 to 5" should be interpreted to include not only the explicitly recited values of 1 to 5, but also include individual values and sub-ranges within the indicated range. Thus, included in this numerical range are individual values such as 2, 3, and 4 and sub-ranges such as from 1-3, from 2-4, and from 3-5, etc., as well as 1, 2, 3, 4, and 5, individually.

This same principle applies to ranges reciting only one numerical value as a minimum or a maximum. Furthermore, such an interpretation should apply regardless of the breadth of the range or the characteristics being described.

Reference throughout this specification to "an example" means that a particular feature, structure, or characteristic described in connection with the example is included in at least one embodiment. Thus, appearances of the phrases "in an example" in various places throughout this specification are not necessarily all referring to the same embodiment.

Example Embodiments

The present disclosure is directed to pulverulent thermoplastic polymer blends that can be employed as a substitute for PA11 and PA12 in powder-based additive manufacturing or 3D printing. The pulverulent thermoplastic polymer blends described herein are based on semicrystalline aliphatic thermoplastic polyurethane (ATP), which generally includes a reaction product of a reaction mixture consisting of or consisting essentially of an aliphatic diisocyanate and a short-chain aliphatic isocyanate-reactive compound. Further, ATP can be blended with a variety of second thermoplastic polyurethanes, referred to herein as TPUs, to provide a thermoplastic polymer blend having one or more improved physical properties (e.g., flexibility, for example) as compared to ATP alone. Without wishing to be bound by theory, it is believed that ATP is at least partially miscible with most TPU resins so as to form a microphase separated structure. Because of the similarity of the ATP and the hard segments in the TPU, no macrophase separation is expected in these blends. Typically, the continuous phase (matrix) can be predominantly ATP and the dispersed phase can be primarily TPU. In such blends, controlled phase separation of hard phase and soft phase can be achieved. These ATP/TPU blends can maintain comparable physical and thermal properties (e.g. melting temperature) to ATP. Meanwhile, the soft TPU phase can tailor the physical properties of the matrix, such as, for example, tensile elongation, and can lower the crystallization temperature.

In further detail, the pulverulent thermoplastic polymer blend described herein can be based on a first thermoplastic polyurethane (i.e., ATP). The ATP can generally be or include a reaction product of a first reaction mixture consisting of or consisting essentially of an aliphatic diisocyanate having a number average molecular weight of from 140 g/mol to 170 g/mol and an aliphatic diol having a number average molecular weight of from 62 g/mol to 120 g/mol. It is noted that the ATP is generally produced from low molecular weight constituents that are typically used to produce the hard segment of a thermoplastic polyurethane. Further, the ATP can typically be produced from low molecular weight constituents having a number average molecular weight of less than or equal to 170 g/mol. Thus, the ATP is not produced from components typically employed as soft-segment components of thermoplastic polyurethane, such as those described below with respect to the isocyanate-reactive components. Further, the use of such soft-segment components would adversely and materially affect the intended physical/thermal properties of the ATP disclosed herein. The number average molecular weights can be determined by gel permeation chromatography against a polymethyl methacrylate standard or any other suitable method Suitable aliphatic diisocyanates can generally be monomeric aliphatic diisocyanates. Additionally, the diisocyanates employed to prepare the ATP can be produced via any suitable process, such as by phosgenation or by a phosgene-free process. Non-limiting examples of suitable aliphatic diisocyanates can include 1,4-diisocyanatobutane, 1,5-diisocyanatopentane, 1,6-diisocyantohexane, 1,5-diisocyanato-2-methylpentane, the like, or a combination thereof. In some specific examples, the aliphatic diisocyanate can be or include 1,4-diisocyanatobutane. In some other specific examples, the aliphatic diisocyanate can be or include 1,5-diisocyanatopentane. In additional specific examples, the aliphatic diisocyanate can be or include 1,6-diisocyantohexane. In still additional specific examples, the aliphatic diisocyanate can be or include 1,5-diisocyanato-2-methylpentane. It is further noted that the aliphatic diisocyanate used to prepare the ATP typically does not include a cycloaliphatic diisocyanate. Thus, in some examples, the monomeric aliphatic diisocyanate used to prepare the ATP includes only linear aliphatic diisocyanates, such as 1,4-diisocyanatobutane, 1,5-diisocyanatopentane, 1,6-diisocyantohexane, 1,5-diisocyanato-2-methylpentane, or the like.

A variety of suitable aliphatic diols can be combined and allowed to react with the aliphatic diisocyanate to produce the ATP. As previously described, the aliphatic diol generally has a number average molecular weight of from about 62 g/mol to about 120 g/mol. In some specific examples, the aliphatic diol can be or include 1,2-ethanediol, 1,2-propanediol, 1,3-propanediol, 1,2-butanediol, 1,3-butandiol, 1,4-butanediol, 1,2-pentanediol, 1,3-pentanediol, 1,4-pentanediol, 1,5-pentanediol, 1,2-hexanediol, 1,3-hexanediol, 1,4-hexanediol, 1,5-hexanediol, 1,6-hexanediol, the like, or a combination thereof. In some specific examples, the aliphatic diol can be or include 1,2-ethanediol. In some other examples, the aliphatic diol can be or include 1,2-propanediol. In other examples, the aliphatic diol can be or include 1,3-propanediol. In additional examples, the aliphatic diol can be or include 1,2-butanediol. In still additional examples, the aliphatic diol can be or include 1,3-butanediol. In yet additional examples, the aliphatic diol can be or include 1,4-butanediol. In further examples, the aliphatic diol can be or include 1,2-pentanediol. In still further examples, the aliphatic diol can be or include 1,3-pentanediol. In yet further examples, the aliphatic diol can be or include 1,4-pentanediol. In additional examples, the aliphatic diol can be or include 1,5-pentanediol. In other examples, the aliphatic diol can be or include 1,2-hexanediol. In still other examples, the aliphatic diol can be or include 1,3-hexanediol. In additional examples, the aliphatic diol can be or include 1,4-hexanediol. In still additional examples, the aliphatic diol can be or include 1,5-hexanediol. In further examples, the aliphatic diol can be or include 1,6-hexanediol. It is further noted that the aliphatic diol used to prepare the ATP typically does not include a cycloaliphatic diol. Thus, in some examples, the aliphatic diol includes only linear aliphatic diols, such as 1,2-ethanediol, 1,2-propanediol, 1,3-propanediol, 1,2-butanediol, 1,3-butandiol, 1,4-butanediol, 1,2-pentanediol, 1,3-pentanediol, 1,4-pentanediol, 1,5-pentanediol, 1,2-hexanediol, 1,3-hexanediol, 1,4-hexanediol, 1,5-hexanediol, 1,6-hexanediol, or the like.

The aliphatic diisocyanate and the aliphatic diol can be combined at a variety of ratios and allowed to react to form the ATP. Generally, the aliphatic diisocyanate and the aliphatic diol can be combined at an equivalent ratio of isocyanate equivalents to hydroxyl equivalents of from 0.95:1 to 1:0.95. In some additional examples, the aliphatic diisocyanate and the aliphatic diol can be combined at an equivalent ratio of isocyanate equivalents to hydroxyl equivalents of from 0.98:1 to 1:0.98, or from 0.99:1 to 1:0.99.

In some additional examples, the ATP can have a z-average molecular weight ($M_z$) of from 100,000 g/mol to 900,000 g/mol. In another example, the ATP can have an $M_z$ of from 100,000 g/mol to 850,000 g/mol. In still additional examples, the ATP can have an $M_z$ of from 110,000 g/mol to 800,000. In yet additional examples, the ATP can have an $M_z$ of from 120,000 g/mol to 760,000 g/mol. The z-average molecular weights can be determined by gel permeation chromatography against a polymethyl methacrylate standard.

$M_z$ can be defined by the following formula:

$$M_z = \frac{\sum_i n_i M_i^3}{\sum_i n_i M_i^2} \text{ in g/mol}$$

where $M_i$ is the molecular weight of a polymer chain, $n_i$ is the number of polymer chains of that molecular weight, and i is the number of polymer molecules.

In some additional examples, the ATP can have a relatively low molecular weight. One way to measure the molecular weight of the ATP is via melt volume-flow rate (MVR), where higher MVR values can indicate a lower molecular weight for the neat polymer. With this in mind, in some examples, the ATP can have a melt volume-flow rate (MVR) of at least 20 $cm^3$/10 minutes at 200° C. and 8.7 kg based on test method ASTM D1238-10. In other examples, the ATP can have an MVR of at least 30 $cm^3$/10 minutes, or at least 35 $cm^3$/10 minutes, or at least 40 $cm^3$/10 minutes at 200° C. and 8.7 kg based on test method ASTM D1238-10.

Additionally, the ATP employed in the pulverulent thermoplastic polymer blend can have a relatively high degree of crystallinity. This is because, in some examples, amorphous materials do not have good heat and solvent resistance. Thus, in some examples, the ATP can be a semicrystalline material. One way to measure the degree of crystallinity can be via melting enthalpy, where higher melting enthalpy indicates higher crystallinity. With this in mind, the ATP employed in the thermoplastic polymer blend can generally have a melting enthalpy of at least 60 joules per gram (J/g) based on differential scanning calorimetry (DSC) measurements during a second heating trace from −25° C. to 250° C. at a heating rate of 20° C./min. In some additional examples, the ATP employed in the thermoplastic polymer blend can have a melting enthalpy of at least 70 J/g, 75 J/g, 80 J/g, or 85 J/g based on DSC during a second heating trace from −25° C. to 250° C. at a heating rate of 20° C./min.

As described above the first thermoplastic polyurethane, or ATP, can be blended with a second thermoplastic polyurethane, or TPU, to provide a pulverulent thermoplastic polymer blend having modified mechanical properties relative to the ATP alone. The ATP and TPU can be blended in a variety of amounts to produce the pulverulent thermoplastic polymer blend. Typically, the ATP and the TPU can be blended at a weight ratio of 90:10 to 30:70 ATP to TPU. In some additional examples, the ATP and TPU can be blended at a weight ratio of from 85:15 to 50:50 ATP to TPU. In some specific examples, the ATP and TPU can be blended at a weight ratio of from 90:10 to 70:30, from 80:20 to 60:40, from 70:30 to 50:50, from 60:40 to 40:60, or from 50:50 to 30:70.

A variety of TPUs can be blended with the ATP. Generally, the TPU can be a reaction product of a second reaction mixture including a polyisocyanate, an isocyanate-reactive component having a number average molecular weight ($M_n$) of from 500 g/mol to 10,000 g/mol, and a chain extender having an $M_n$ of from 60 g/mol to 450 g/mol. The number average molecular weights can be determined by gel permeation chromatography against a polymethyl methacrylate standard or other suitable method. The polyisocyanate and the chain extender can form the "hard segment" of the TPU and the isocyanate-reactive component can form the "soft segment" of the TPU.

In further detail, a variety of polyisocyanates can be employed to prepare the TPU. As used herein, the term "polyisocyanate" refers to compounds that are isocyanate-functional and include at least two un-reacted isocyanate groups. Thus, polyisocyanates can include diisocyanates and/or isocyanate-functional reaction products of diisocyanates comprising, for example, biuret, isocyanurate, uretdione, isocyanate-functional urethane, isocyanate-functional urea, isocyanate-functional iminooxadiazine dione, isocyanate-functional oxadiazine dione, isocyanate-functional carbodiimide, isocyanate-functional acyl urea, isocyanate-functional allophanate groups, the like, or combinations thereof.

The polyisocyanate employed in the TPU can include an aliphatic polyisocyanate, an aromatic polyisocyanate, or a combination thereof. Non-limiting examples of aliphatic polyisocyanates can include ethylene diisocyanate, tetramethylene 1,4-diisocyanate, hexamethylene 1,6-diisocyanate, dodecane 1,12-diisocyanate, isophorone diisocyanate, cyclohexane 1,4-diisocyanate, 1-methylcyclohexane 2,4-diisocyanate, 1-methylcyclohexane 2,6-diisocyanate, dicyclohexylmethane 4,4'-diisocyanate, dicyclohexylmethane 2,4'-diisocyanate, dicyclohexylmethane 2,2'-diisocyanate, isomers thereof, the like, or a combination thereof. Non-limiting examples of aromatic polyisocyanates can include tolylene 2,4-diisocyanate, tolylene 2,6-diisocyanate, diphenylmethane 4,4'-diisocyanate, diphenylmethane 2,4'-diisocyanate, diphenylmethane 2,2'-diisocyanate, the like, or a combination thereof.

A variety of isocyanate-reactive components can also be used to prepare the TPU. As mentioned above, the isocyanate-reactive component can generally have a number average molecular weight $M_n$ of from 500 g/mol to 10,000 g/mol. In some additional examples, the isocyanate-reactive component can have an $M_n$ of from 600 g/mol to 6000 g/mol, from 800 g/mol to 5000 g/mol, or from 1000 g/mol to 4000 g/mol. The number average molecular weight can be determined by gel permeation chromatography against a polymethyl methacrylate standard or other suitable method.

Additionally, the isocyanate-reactive component can generally have an average of from 1.8 to 3.0 Zerewitinoff-active hydrogen atoms. The Zerewitinoff-active hydrogen atoms can be included in amine groups, thiol groups, carboxyl groups, hydroxyl groups, or a combination thereof. Thus, the isocyanate-reactive component can be or include a polyether, a polyester, a polycarbonate, a polycarbonate ester, a polycaprolactone, a polybutadiene, the like, or a combination thereof.

Examples of polyether polyols can be formed from the oxyalkylation of various polyols, for example, glycols such as ethylene glycol, 1,2- 1,3- or 1,4-butanediol, 1,6-hexanediol, and the like, or higher polyols, such as trimethylol propane, pentaerythritol, and the like. One commonly utilized oxyalkylation method is by reacting a polyol with an alkylene oxide, for example, ethylene oxide or propylene oxide in the presence of a basic catalyst or a coordination catalyst such as a double-metal cyanide (DMC).

Examples of suitable polyester polyols can be prepared by the polyesterification of organic polycarboxylic acids, anhydrides thereof, or esters thereof with organic polyols. Preferably, the polycarboxylic acids and polyols are aliphatic or aromatic dibasic acids and diols.

The diols which may be employed in making the polyester include alkylene glycols, such as ethylene glycol, 1,2-, 1,3-, or 1,4-butanediol, neopentyl glycol and other glycols such as cyclohexane dimethanol, caprolactone diol (for example, the reaction product of caprolactone and ethylene glycol), polyether glycols, for example, poly(oxytetramethylene) glycol and the like. However, other diols of various types and, as indicated, polyols of higher functionality may also be utilized in various embodiments of the invention. Such higher polyols can include, for example, trimethylol propane, trimethylol ethane, pentaerythritol, and the like, as well as higher molecular weight polyols such as those produced by oxyalkylating low molecular weight polyols.

The acid component of the polyester consists primarily of monomeric carboxylic acids, or anhydrides thereof, or esters thereof having 2 to 18 carbon atoms per molecule. Among the acids which are useful are phthalic acid, isophthalic acid, terephthalic acid, tetrahydrophthalic acid, hexahydrophthalic acid, adipic acid, succinic acid, azelaic acid, sebacic acid, maleic acid, glutaric acid, chlorendic acid, tetrachlorophthalic acid and other dicarboxylic acids of varying types. Also, there may be employed higher polycarboxylic acids such as trimellitic acid and tricarballylic acid.

In addition to polyester polyols formed from polybasic acids and polyols, polycaprolactone-type polyesters can also be employed. These products are formed from the reaction of a cyclic lactone such as ε-caprolactone with a polyol containing primary hydroxyls such as those mentioned above. Such products are described in U.S. Pat. No. 3,169,949.

Suitable hydroxy-functional polycarbonate polyols may be those prepared by reacting monomeric diols (such as 1,4-butanediol, 1,6-hexanediol, di-, tri- or tetraethylene glycol, di-, tri- or tetrapropylene glycol, 3-methyl-1,5-pentanediol, 4,4'-dimethylolcyclohexane and mixtures thereof) with diaryl carbonates (such as diphenyl carbonate, dialkyl carbonates (such as dimethyl carbonate and diethyl carbonate), alkylene carbonates (such as ethylene carbonate or propylene carbonate), or phosgene. Optionally, a minor amount of higher functional, monomeric polyols, such as trimethylolpropane, glycerol or pentaerythritol, may be used.

A variety of chain extenders can also be used to prepare the TPU. As described above, the chain extender can generally have an $M_n$ of from 60 g/mol to 450 g/mol. In some additional examples, the chain extender can have an $M_n$ of from 80 g/mol to 400 g/mol or from 100 g/mol to 350 g/mol. The number average molecular weight can be determined by gel permeation chromatography against a polymethyl methacrylate standard or other suitable method.

Additionally, the chain extender can generally have an average of from 1.8 to 3.0 Zerewitinoff-active hydrogen atoms. The Zerewitinoff-active hydrogen atoms can be included in amine groups, thiol groups, carboxyl groups, hydroxyl groups, the like, or a combination thereof. Thus, the chain extender can include a polyol, a polyamine, the like, or a combination thereof.

In some examples, the chain extender can include a diol. In some specific examples, the chain extender can include an aliphatic diol having from 2 to 14 carbon atoms, e.g. ethanediol, 1,2-propanediol, 1,3-propanediol, 1,4-butanediol, 2,3-butanediol, 1,5-pentanediol, 1,6-hexanediol, diethylene glycol, dipropylene glycol, the like, or a combination thereof. Additional examples of chain extenders can include a diester of terephthalic acid with a glycol having from 2 to 4 carbon atoms (e.g. bis(ethylene glycol) terephthalate or bis-1,4-butanediol terephthalate, for example), a hydroxyalkylene ether of hydroquinone (e.g. 1,4-di(b-hydroxyethyl) hydroquinone, for example), an ethoxylated bisphenol (e.g. 1,4-di(b-hydroxyethyl)bisphenol A, for example), a (cyclo) aliphatic diamine (e.g. isophoronediamine, for example), ethylenediamine, 1,2-propylenediamine, 1,3-propylenediamine, N-methylpropylene-1,3-diamine, N,N'-dimethylethylenediamine, an aromatic diamine (e.g. 2,4-toluenediamine, 2,6-toluenediamine, 3,5-diethyl-2,4-toluenediamine or 3,5-diethyl-2,6-toluenediamine, for example) a primary monoalkyl-, dialkyl-, trialkyl- or tetraalkyl-substituted 4,4'-diaminodiphenylmethane, the like, or a combination thereof. In some specific examples, the chain extender can include ethanediol, 1,4-butanediol, 1,6-hexanediol, 1,4-di(B-hydroxyethyl)hydroquinone, 1,4-di(B-hydroxyethyl)-bisphenol A, or a combination thereof. In some further examples, the chain extender can also include a triol. It is also possible to use mixtures of any of the abovementioned chain extenders.

In some examples, compounds that are monofuntional toward isocyanates can be used as chain termination agents in an amount of up to 2 wt %, based on a total weight of the TPU. Non-limiting examples of chain termination agents can include monoamines (e.g., butylamine, dibutylamine, octylamine, stearylamine, N-methylstearylamine, pyrrolidine, piperidine, cyclohexylamine, for example) monoalcohols (e.g., butanol, 2-ethylhexanol, octanol, dodecanol, stearyl alcohol, the various amyl alcohols, cyclohexanol, ethylene glycol monomethyl ether, for example), the like, or a combination thereof.

It is noted that both the isocyanate-reactive component and the chain extender include functional groups that are reactive toward isocyanate functional groups. With this in mind, the polyisocyanate can generally be combined with the isocyanate-reactive component and the chain extender to achieve an equivalent ratio of isocyanate equivalents to equivalents of functional groups reactive toward isocyanates of from 0.9:1 to 1.2:1, or from 0.95:1 to 1.1:1.

The TPU can have a variety of Shore D hardnesses depending on the particular mechanical properties desired to be imparted to the thermoplastic polyurethane blend. Additionally, where the hard segment of the TPU has a similar composition to the ATP, it can favor good miscibility with the ATP. In some examples, the TPU can have a Shore D hardness of from 50D to 90D according to ASTM D2240-15e1. In some specific examples, the TPU can have a Shore D hardness of from 50D to 60D, from 60D to 70D, from 70D to 80D, from 75D to 85D, or from 80D to 90D according to ASTM D2240-15e1.

In some additional examples, the TPU can have a high hard-segment content. As described previously, the hard-segment can typically be defined as the polyisocyanate and the chain extender components in the TPU. The soft-segment can typically be defined as the isocyanate-reactive component in the TPU. With this in mind, in some examples, the second reaction mixture can include no more than 40 wt % of the isocyanate-reactive component, or at least 60 wt % hard-segment components (e.g., polyisocyanate and chain extender). In other examples, the second reaction mixture can include no more than 35 wt % of the isocyanate-reactive component, or at least 65 wt % hard-segment components. In still additional examples, the second reaction mixture can include no more than 30 wt % of the isocyanate-reactive component, or at least 70 wt % hard-segment components. In still further examples, the second reaction mixture can include no more than 25 wt % of the isocyanate-reactive component, or at least 75 wt % hard-segment components. In yet further examples, the second reaction mixture can include no more than 20 wt % of the isocyanate-reactive component, or at least 80 wt % hard-segment components. In additional examples, the second reaction mixture can include no more than 15 wt % of the isocyanate-reactive component, or at least 85 wt % hard-segment components.

The ATP and the TPU can be mixed in a variety of ways, such as via co-extrusion, batch mixing, or the like to provide a precursor thermoplastic polymer blend. Generally, the ATP and the TPU can be mixed at a suitably elevated temperature to allow both components to thoroughly mix and interact.

The precursor thermoplastic polymer blend can then be comminuted to form the pulverulent thermoplastic polymer blend. Comminuting can be performed in a variety of ways. Non-limiting examples can include dry milling or grinding in a jet mill, a pin mill, or the like, wet media milling, the Ike, or a combination thereof. Additionally, in some examples, grinding or milling can be performed under cryogenic conditions to minimize the heat transferred to the precursor thermoplastic polymer blend during comminuting. As such, comminuting can include cryogenic comminuting.

As described above, the pulverulent thermoplastic polymer blends described herein can provide a material having a variety of desirable thermal, mechanical, and chemical properties. For example, in some cases, the pulverulent thermoplastic polymer blends can have a melting temperature that is less than PA11, PA12, and/or ATP alone. In some specific examples, the pulverulent thermoplastic polymer blends can have a melting temperature of less than or equal to 175° C. based on a second heating trace of a differential scanning calorimetry (DSC) analysis from −25° C. to 250° C. with a temperature ramp 20° C./min. In some additional examples, the pulverulent polymer blends can have a melting temperature of less than or equal to 170° C., less than or equal to 165° C., less than or equal to 160° C., or less than or equal to 155° C. based on a second heating trace of a DSC analysis from −25° C. to 250° C. with a temperature ramp 20° C./min.

Additionally, in some examples, the pulverulent thermoplastic polymer blends can have a sintering window (or recrystallization window) between the melting temperature and the crystallization temperature (melting temperature ($T_m$)-crystallization temperature ($T_c$)) that is greater than PA11, PA12, and/or ATP alone. In further detail, the sintering window is defined as the difference between the melting temperature and the crystallization temperature based on a second heating trace of a differential scanning calorimetry (DSC) analysis from −25° C. to 250° C. with a temperature ramp 20° C./min. With this in mind, in some specific examples, the pulverulent thermoplastic polymer blends can have a sintering window of at least 42° C. In some additional examples, the pulverulent thermoplastic polymer blends can have a sintering window of at least 45° C., at least 50° C., at least 55° C., at least 60° C., at least 65° C., or at least 70° C.

In some additional examples, the pulverulent thermoplastic polymer blends can have a melting enthalpy of at least 10 joules per gram (J/g) based on a second heating trace of a DSC analysis from −25° C. to 250° C. with a temperature ramp 20° C./min. In still additional examples, the pulverulent thermoplastic polymer blends can have a melting enthalpy of at least 20 J/g, at least 30 J/g, at least 40 J/g, at least 50 J/g, or at least 60 J/g based on a second heating trace of a DSC analysis from −25° C. to 250° C. with a temperature ramp 20° C./min.

In some examples, the pulverulent thermoplastic polymer blends described herein can have an elongation at break that is greater than an elongation at break of PA11, PA12, and/or ATP alone. In some examples, the pulverulent thermoplastic polymer blends can have an elongation at break of at least 85% based on ASTM D638-14 at 23° C. In some additional examples, the pulverulent thermoplastic polymer blends can have an elongation at break of at least 100% or at least 140% based on ASTM D638-14 at 23° C. In still additional examples, the pulverulent thermoplastic polymer blends can have an elongation at break of at least 180%, at least 230%, or at least 270% based on ASTM D638-14 at 23° C.

Generally, the pulverulent thermoplastic polymer blends can have a tensile modulus that is greater than 1 gigapascal (GPa) (or 1000 MPa) based on ASTM D638-14 at 23° C. For example, in some cases, the pulverulent thermoplastic polymer blends can have a tensile modulus of greater than 1200 megapascals (MPa) based on ASTM D638-14 at 23° C. In some additional examples, the pulverulent thermoplastic polymer blends can have a tensile modulus of greater than 1400 MPa, greater than 1400 MPa, greater than 1500 MPa, greater than 1600 MPa, or greater than 1700 MPa based on ASTM D638-14 at 23° C.

In some further examples, the pulverulent thermoplastic polymer blends can have a tensile strength at break of at least 35 MPa based on ASTM D638-14 at 23° C. In still additional examples, the pulverulent thermoplastic polymer blends can have a tensile strength at break of at least 40 MPa, at least 45 MPa, at least 50 MPa, or at least 55 MPa based on ASTM D638-14 at 23° C. In some specific examples, the pulverulent thermoplastic polymer blends can have a tensile strength at break of from 35 MPa to 45 MPa, from 40 MPa to 50 MPa, from 45 MPa to 55 MPa, or from 50 MPa to 60 MPa based on ASTM D638-14 at 23° C.

In some examples, the pulverulent thermoplastic polymer blend alone can form a suitable additive manufacturing build material. In some further examples, the pulverulent thermoplastic polymer blend can be combined with or admixed with one or more additional materials or additives to form an additive manufacturing build material. Non-limiting examples of additive manufacturing additives that can be added to the pulverulent thermoplastic polymer blend can include a colorant, an antioxidant, an antiozonant, a stabilizer (e.g., a hydrolysis stabilizer, a light stabilizer, a heat stabilizer, a color stabilizer, etc.), a filler, a lubricant, an inhibitor, an electromagnetic radiation absorber (e.g., a UV absorber, an IR absorber, etc.), a reinforcing agent, the like, or a combination thereof.

The present disclosure also describes methods of manufacturing pulverulent thermoplastic polymer blends. Generally, the method can include comminuting a precursor thermoplastic polymer blend to a particle size of less than 300 μm to form the pulverulent thermoplastic polymer blends. As described above, comminuting can include dry milling or grinding in a jet mill, a pin mill, or the like, wet media milling, the like, or a combination thereof. Additionally, in some examples, grinding or milling can be performed under cryogenic conditions to minimize the heat transferred to the precursor thermoplastic polymer blend during comminuting. As such, comminuting can include cryogenic comminuting.

In further detail, the precursor thermoplastic polymer blends can be comminuted to a particle size that is suitable for the intended additive manufacturing process. Generally, the average particle size can be less than 300 μm, but particles outside of this range may be desirable in some circumstances. In some specific examples, the precursor thermoplastic polymer blends can be comminuted to an average particle size of from 1 μm to 250 μm. In still additional examples, the precursor thermoplastic polymer blends can be comminuted to an average particle size of from about 1 μm to 50 μm, from 20 μm to 100 μm, from 50 μm to 150 μm, or from 100 μm to 200 μm. As used herein, "particle size" refers to the largest diameter of a particle. The particle size can be measured using dynamic light scatting, laser diffraction, or the like.

In some additional examples, the methods can include mixing or blending the ATP and the TPU to form a precursor thermoplastic polymer blend. Mixing or blending can be performed by any suitable process, such as batch mixing, extrusion (e.g., continuous extrusion), the like, or a combination thereof. Additionally, the ATP and the TPU can be mixed at any suitable temperature to allow both components to thoroughly mix and interact.

The present disclosure is also directed to a 3D-printed article that includes a pulverulent thermoplastic polymer blend as described herein fused together to form the 3D-printed article. As used herein, "fused" is not intended to be limiting as to a particular manner of connection between the pulverulent thermoplastic polymer blend particles. "Fused" can generally refer to bonding, melting, curing, or the like, or a combination thereof to connect the particles together to form a three-dimensional object. The pulverulent thermoplastic polymer blend can be employed in a variety of additive manufacturing processes to form a 3D printed article. For example, computer aided drafting (CAD) software or other suitable software can be employed to generate a 3D object model. Based on the 3D object model, a 3D article can be printed via a variety of additive manufacturing techniques. In some specific examples, the additive manufacturing technique can be a powder bed fusion technique, such as selective laser sintering (SLS), high speed sintering (HSS) (e.g., multi jet fusion (MJF)), or the like. Other suitable additive manufacturing techniques can also be employed, where appropriate.

EXAMPLES

Example I—Thermal Properties of Thermoplastic Polymer Blends

Various thermoplastic polymer blends were prepared by blending a first thermoplastic polyurethane (ATP) having an MVR of about 40 cm³/10 minutes at 200° C. and 8.7 kg with various second thermoplastic polyurethanes (TPUs) as presented in Table I:

TABLE I

| Thermoplastic Polyurethane Components | | | |
|---|---|---|---|
| Sample | Chemistry | Shore Hardness | Hard Segment Content |
| TPU1 | Aromatic Ether-based | 76D | 70% |
| TPU2 | Aliphatic Ester-based | 80D | 80%-85% |

TABLE I-continued

Thermoplastic Polyurethane Components

| Sample | Chemistry | Shore Hardness | Hard Segment Content |
|---|---|---|---|
| TPU3 | Aromatic Ester-based | 93A | 47% |
| TPU3 | Aromatic Ether-based | 85A | 38% |

The various TPUs were blended with ATP by hand at room temperature to prepare various thermoplastic polymer blends. The thermoplastic polymer blends were then molded for tensile testing using an Milacron Roboshot injection molding machine at a temperature of about 410-420° F. Differential scanning calorimetry (DSC) analyses were performed using a PerkinElmer DSC8000, heating from −25 to 250° C. with a temperature ramp of 20° C./min for both heating and cooling. The results are presented below in Table II:

TABLE II

Results of Thermal Properties Testing

| Sample | Tc ($1^{st}$ cooling) (° C.) | Tm ($2^{nd}$ heating) (° C.) | ΔH ($2^{nd}$ heating) (J/g) | Tm-Tc (° C.) |
|---|---|---|---|---|
| PA12* (Comparative) | 139 | 178 | 62 | 39 |
| PA11** (Comparative) | 149 | 186 | 55 | 37 |
| ATP (Comparative) | 138 | 179 | 85 | 41 |
| TPU1 (Comparative) | 115 | 190, 210 | 22 | 75 |
| TPU2 (Comparative) | NA | NA | NA | NA |
| TPU3 (Comparative) | 71 | 163 | 12.1 | 92 |
| TPU4 (Comparative) | 58 | 140, 154 | 17.1 | >80 |
| Blend 1 (ATP + 30% TPU1) (Inventive) | 117 | 169 | 42 | 52 |
| Blend 2 (ATP + 30% TPU2) (Inventive) | 107 | 162 | 43 | 55 |
| Blend 3 (ATP + 50% TPU2) (Inventive) | 58 | 153 | 14 | 95 |
| Blend 4 (ATP + 30% TPU3) (Inventive) | 128 | 171 | 62 | 43 |
| Blend 5 (ATP + 30% TPU4) (Inventive) | 130 | 172 | 47 | 42 |
| PA11** + 30% TPU2 (Comparative) | 48 (weak peak) | No distinct peak | — | — |

*Purchased from Sigma-Aldrich
**RILSAN® BESNO TL PA11 from ARKEMA

Figure 1:
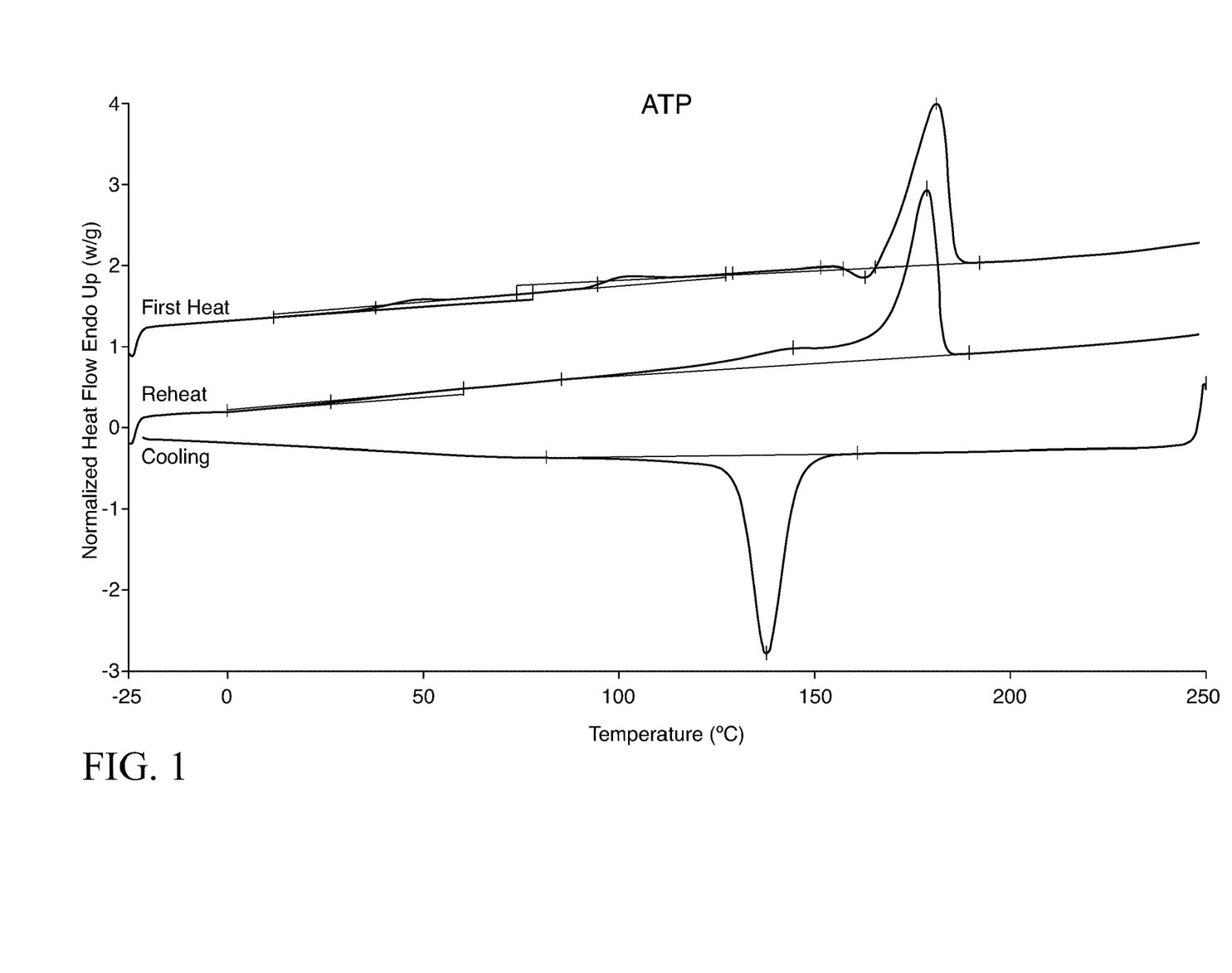
FIG. 1 is a differential scanning calorimetry (DSC) curve for an aliphatic thermoplastic polyurethane (ATP)
Figure 2:
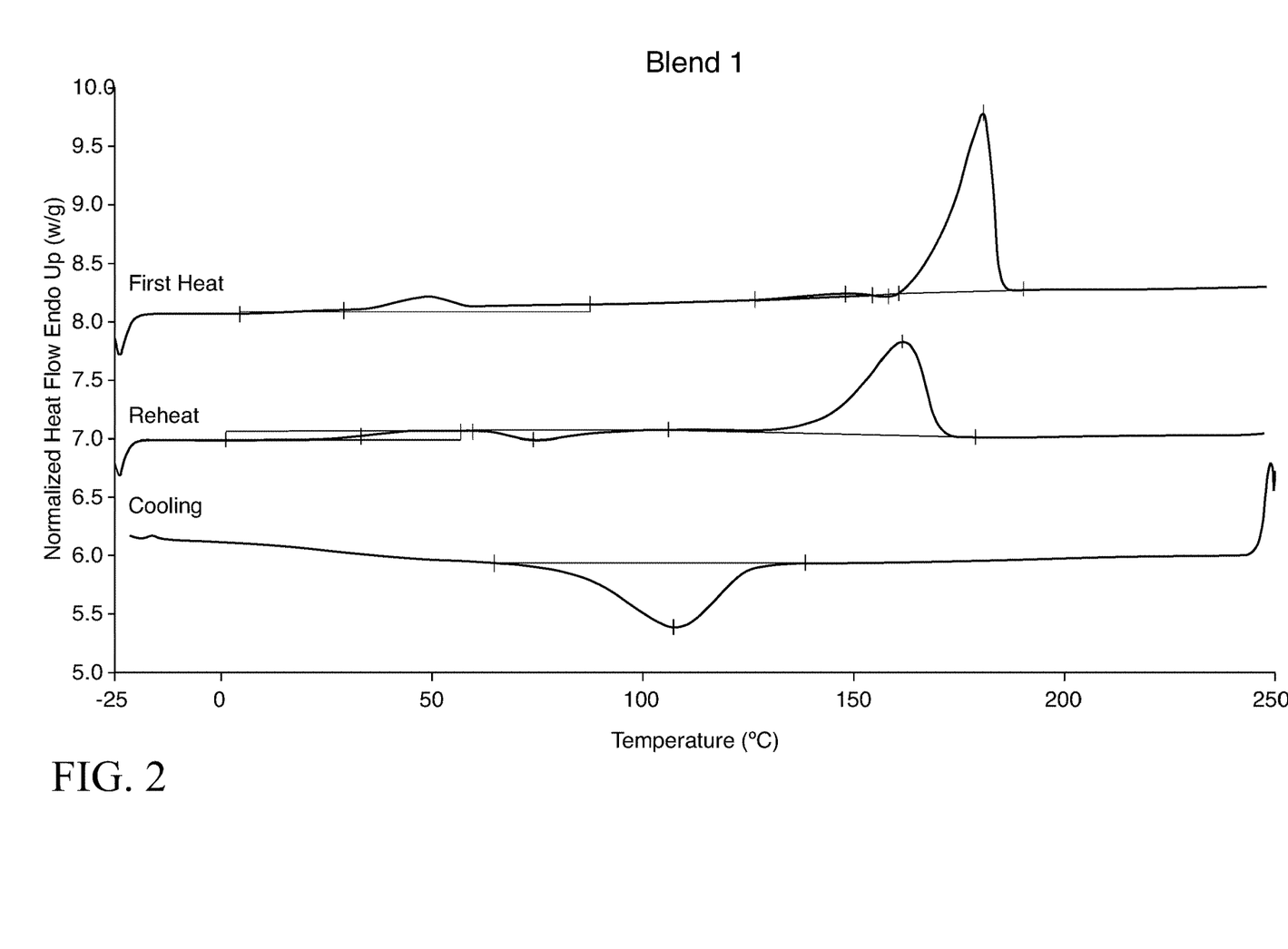
FIG. 2 is a DSC curve for an example ATP/thermoplastic polyurethane (TPU) blend.
Figure 3:
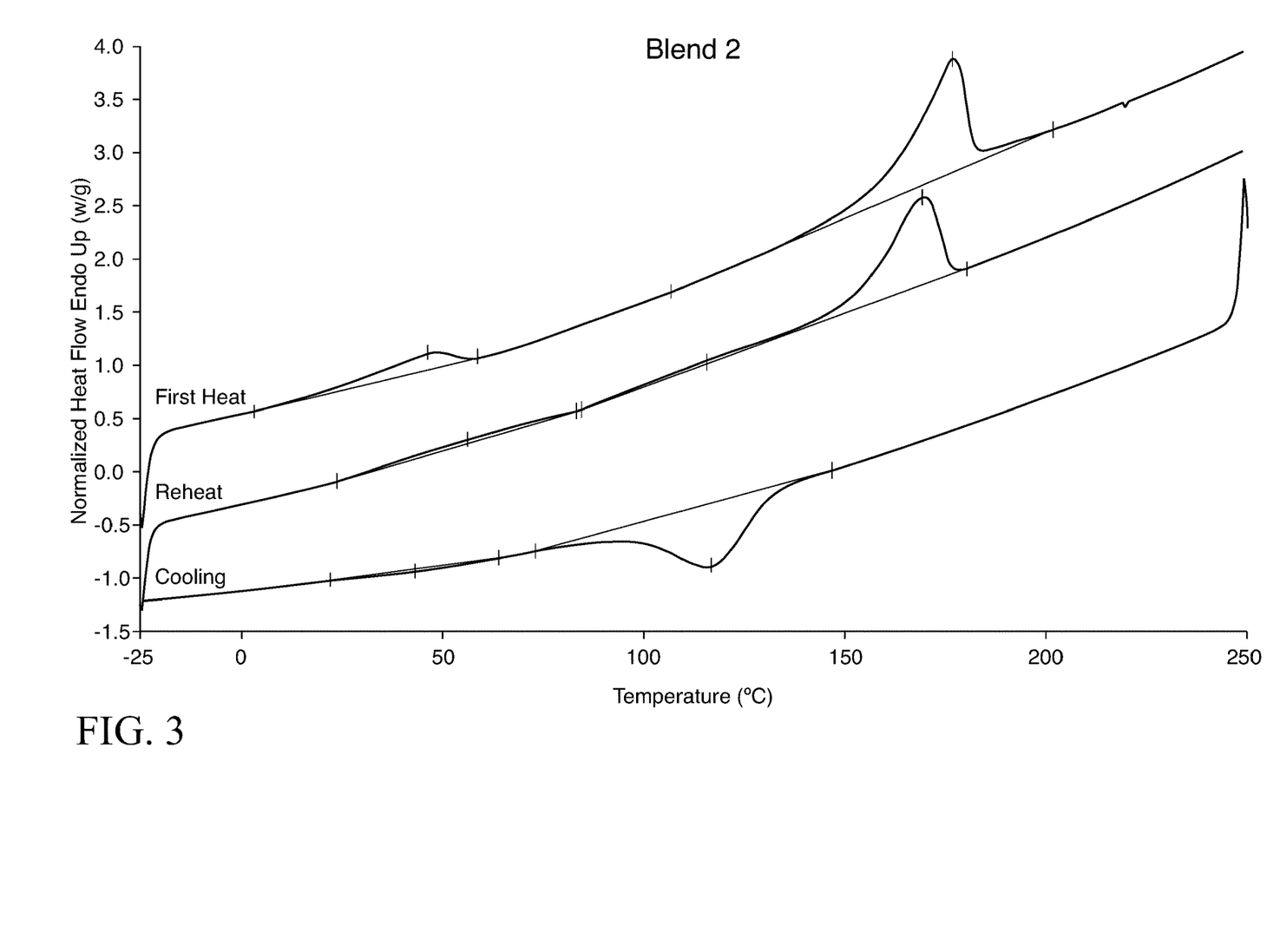
FIG. 3 is a DSC curve for an example ATP/TPU blend.
Figure 4:
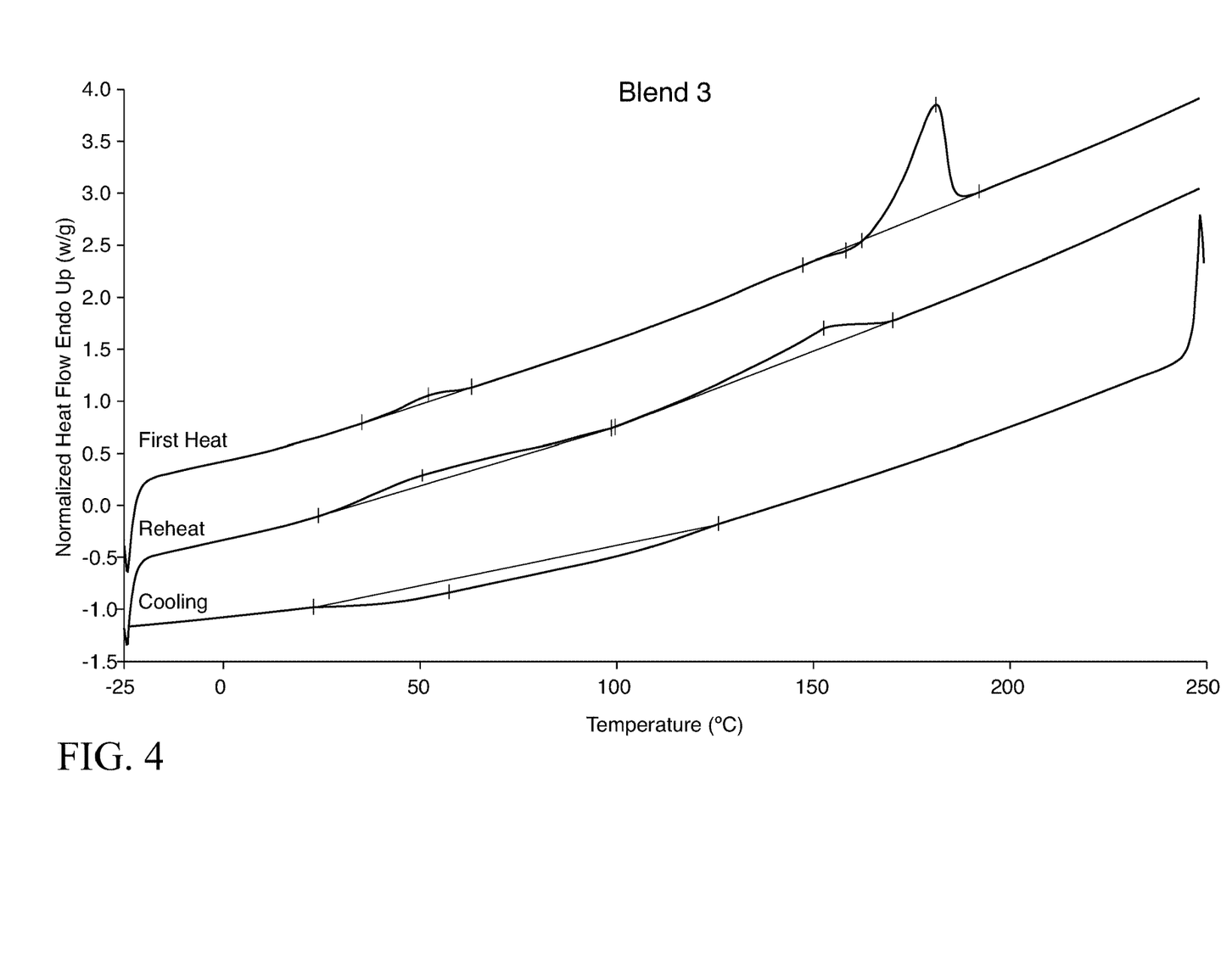
FIG. 4 is a DSC curve for an example ATP/TPU blend.
Figure 5:
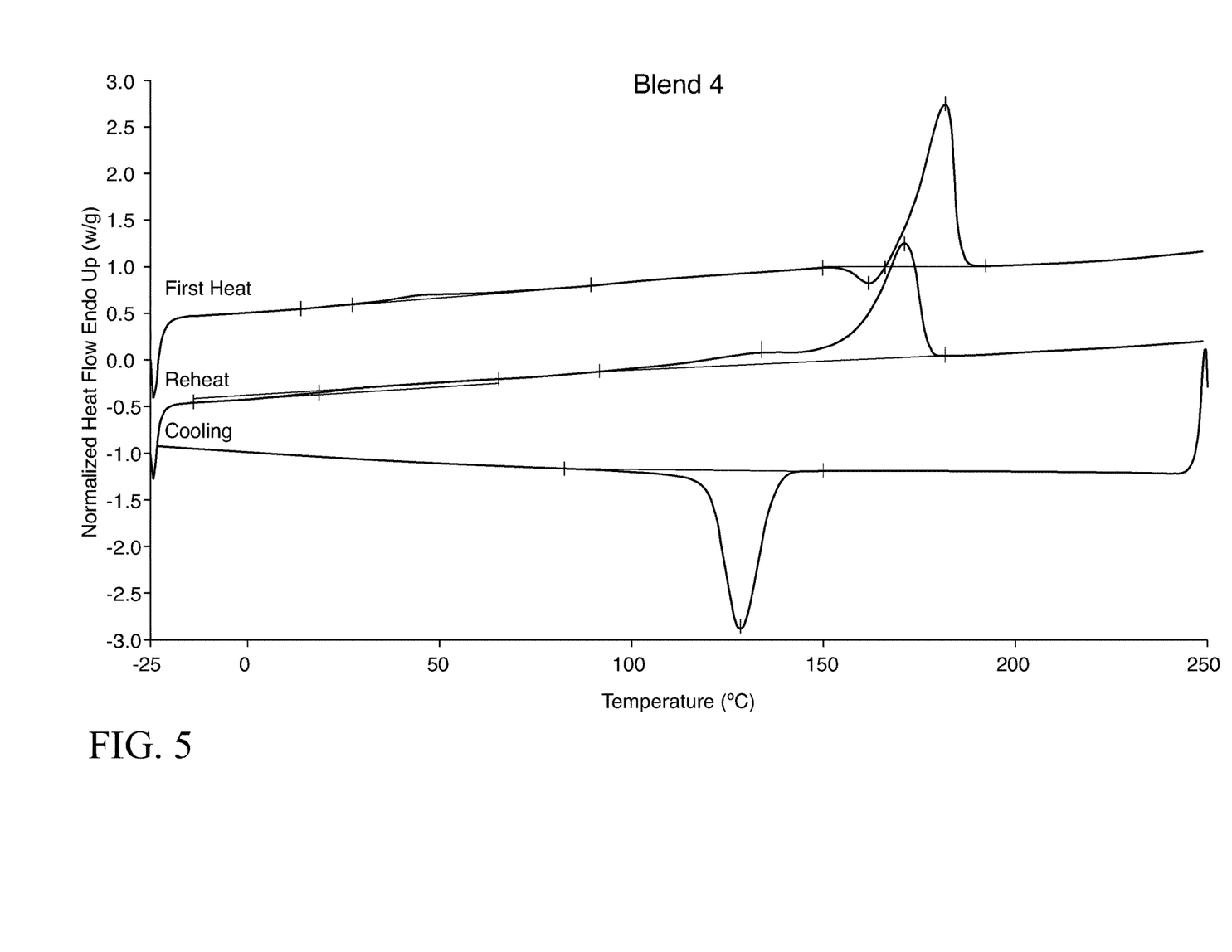
FIG. 5 is a DSC curve for an example ATP/TPU blend.
Figure 6:
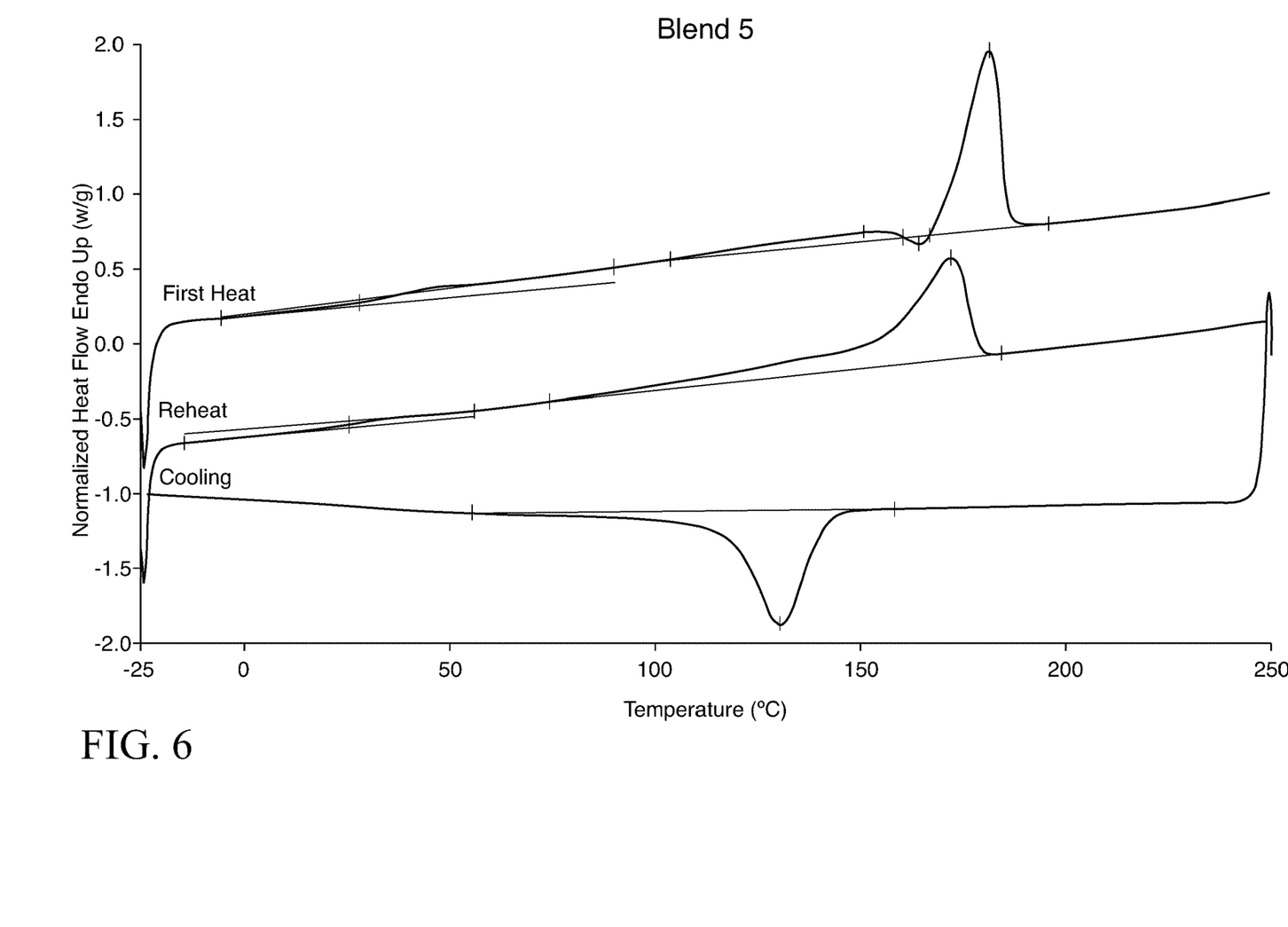
FIG. 6 is a DSC curve for an example ATP/TPU blend.

As can be seen from the results presented in Table II, blending hard TPU with ATP can effectively modify both the melting and crystallization peaks. This is more clearly illustrated in FIGS. 1-6, which present DSC curves for ATP alone and Blends 1-5, respectively. This modification to the melting and crystallization peaks may be attributable to the interaction of the hard segment in the TPU with the ATP resin. This can be highly desirable in powder-based additive manufacturing where the sintering window ($T_m$-$T_c$) can be enlarged while maintaining a relatively low melting temperature for the powder. Thus, the present ATP/TPU blends demonstrate clear advantages in thermal properties compared to traditional hard TPU resins.

Example II—Physical Properties of Thermoplastic Polymer Blends

The blends described in Example 1 were also evaluated to determine some physical properties of the blends as compared to PA11, PA12, and ATP alone. Tensile tests were conducted according to ASTM D638-14 "Standard Test Method for Tensile Properties of Plastics" at 23° C. The results are presented in Table III below:

TABLE III

Results of Physical Properties Testing

| Sample | Elongation at break (%) | Tensile Modulus (MPa) | Tensile strength at break (MPa) |
|---|---|---|---|
| PA12 (Comparative) | 50 | 1350 | 45 |
| PA11 (Comparative) | 80 | 1236 | 41 |
| ATP (Comparative) | 12 | 1816 | 55.7 |
| Blend 1 (Inventive) | 43 | 1766 | 46.6 |
| Blend 2 (Inventive) | 278 | 1258 | 50.8 |
| Blend 3 (Inventive) | 36 | 1460 | 49.1 |
| Blend 4 (Inventive) | 190 | 1100 | 45.1 |
| Blend 5 (Inventive) | 101 | 1063 | 37.7 |

As can be seen from Table III, the ATP/TPU blends not only improve the sintering window as compared to PA11, PA12, and ATP alone, but they can also provide a number of improvements in tensile properties (e.g., elongation at break while maintaining comparable tensile modulus and tensile strength).

It should be understood that the above-described methods are only illustrative of some embodiments of the present invention. Numerous modifications and alternative arrangements may be devised by those skilled in the art without departing from the spirit and scope of the present invention and the appended claims are intended to cover such modifications and arrangements. Thus, while the present invention has been described above with particularity and detail in connection with what is presently deemed to be the most practical and preferred embodiments of the invention, it will be apparent to those of ordinary skill in the art that variations including, may be made without departing from the principles and concepts set forth herein.

What is claimed is:

1. A pulverulent thermoplastic polymer blend, comprising:
   a comminuted thermoplastic polymer blend having a particle size of less than 300 μm, the thermoplastic polymer blend comprising a first thermoplastic polyurethane and a second thermoplastic polyurethane blended at a weight ratio of from 90:10 to 30:70 of first thermoplastic polyurethane to second thermoplastic polyurethane,
   wherein the first thermoplastic polyurethane comprises a reaction product of a first reaction mixture consisting essentially of an aliphatic diisocyanate having a molecular weight of from 140 g/mol to 170 g/mol and an aliphatic diol having a molecular weight of from 62 g/mol to 120 g/mol, wherein the second thermoplastic polyurethane comprises a reaction product of a second reaction mixture comprising a polyisocyanate, an isocyanate-reactive component having a number average molecular weight of from 500 g/mol to 10,000 g/mol, and a chain extender having a number average molecular weight of from 60 g/mol to 450 g/mol, and wherein the first thermoplastic polyurethane has a z-average molecular weight of from 100,000 g/mol to 900,000 g/mol.

2. The pulverulent thermoplastic polymer blend of claim 1, wherein the aliphatic diisocyanate comprises 1,4-diisocyanatobutane, 1,5-diisocyanatopentane, 1,6-diisocyantohexane, 1,5-diisocyanato-2-methylpentane, or a combination thereof.

3. The pulverulent thermoplastic polymer blend of claim 1, wherein the aliphatic diol comprises 1,2-ethanediol, 1,2-propanediol, 1,3-propanediol, 1,2-butanediol, 1,3-butandiol, 1,4-butanediol, 1,2-pentanediol, 1,3-pentanediol, 1,4-pentanediol, 1,5-pentanediol, 1,2-hexanediol, 1,3-hexanediol, 1,4-hexanediol, 1,5-hexanediol, 1,6-hexanediol, or a combination thereof.

4. The pulverulent thermoplastic polymer blend of claim 1, wherein the first thermoplastic polyurethane has a melt volume-flow rate of at least 20 cm3/10 minutes at 200° C. and 8.7 kg based on ASTM D1238-10.

5. The pulverulent thermoplastic polymer blend of claim 1, wherein the first thermoplastic polyurethane has a melting enthalpy of at least 60 J/g based on differential scanning calorimetry during a second heating trace from −25° C. to 250° C. at a heating rate of 20° C./min.

6. The pulverulent thermoplastic polymer blend of claim 1, wherein the polyisocyanate comprises an aliphatic polyisocyanate.

7. The pulverulent thermoplastic polymer blend of claim 1, wherein the polyisocyanate comprises an aromatic polyisocyanate.

8. The pulverulent thermoplastic polymer blend of claim 1, wherein the isocyanate-reactive component comprises a polyether polyol.

9. The pulverulent thermoplastic polymer blend of claim 1, wherein the isocyanate-reactive component comprises a polyester polyol.

10. The pulverulent thermoplastic polymer blend of claim 1, wherein the second reaction mixture comprises no more than 40 wt % of the isocyanate-reactive component.

11. The pulverulent thermoplastic polymer blend of claim 1, wherein the second thermoplastic polyurethane has a Shore D hardness of from 50D to 90D according to ASTM D2240-15e1.

12. The pulverulent thermoplastic polymer blend of claim 1, wherein the pulverulent thermoplastic polymer blend has a melting temperature of less than or equal to 175° C. based on differential scanning calorimetry during a second heating trace from −25° C. to 250° C. at a heating rate of 20° C./min.

13. The pulverulent thermoplastic polymer blend of claim 1, wherein the pulverulent thermoplastic polymer blend has a sintering window of at least 42° C. based on differential scanning calorimetry during a second heating trace from −25° C. to 250° C. at a heating rate of 20° C./min.

14. The pulverulent thermoplastic polymer blend of claim 1, wherein the pulverulent thermoplastic polymer blend has a melting enthalpy of at least 10 J/g based on differential scanning calorimetry during a second heating trace from −25° C. to 250° C. at a heating rate of 20° C./min.

15. The pulverulent thermoplastic polymer blend of claim 1, wherein the pulverulent thermoplastic polymer blend has a tensile modulus of at least 1 GPa based on ASTM D638-14 at 23° C.

16. The pulverulent thermoplastic polymer blend of claim 1, further comprising a colorant, an antioxidant, an antiozonant, a stabilizer, a filler, a lubricant, an inhibitor, a electromagnetic radiation absorber, a reinforcing agent, or a combination thereof.

17. A method of manufacturing a pulverulent thermoplastic polymer blend, comprising:

comminuting a thermoplastic polymer blend to a particle size of less than 300 μm, the thermoplastic polymer blend comprising a first thermoplastic polyurethane and a second thermoplastic polyurethane blended at a weight ratio of from 90:10 to 30:70 first thermoplastic polyurethane to second thermoplastic polyurethane, wherein the first thermoplastic polyurethane comprises a reaction product of a first reaction mixture consisting essentially of an aliphatic diisocyanate having a number average molecular weight of from 140 g/mol to 170 g/mol and an aliphatic diol having a number average molecular weight of from 62 g/mol to 120 g/mol, wherein the second thermoplastic polyurethane comprises a reaction product of second reaction mixture comprising a polyisocyanate, an isocyanate-reactive component having a number average molecular weight of from 500 g/mol to 10,000 g/mol, and a chain extender having a number average molecular weight of from 60 g/mol to 450 g/mol, and wherein the first thermoplastic polyurethane has a z-average molecular weight of from 100,000 g/mol to 900,000 g/mol.

18. The method of claim 17, wherein comminuting comprises cryogenic milling.

19. A three-dimensional printed article, comprising the pulverulent thermoplastic polymer blend of claim 1 fused together to form the three-dimensional printed article.

* * * * *